Patented Jan. 18, 1938

2,106,089

UNITED STATES PATENT OFFICE 2,106,089

METHOD OF PREPARING STABLE CHOCOLATE MILK

Bernice Fick, Cincinnati, Ohio, assignor to Kroger Grocery & Baking Company, Cincinnati, Ohio, a corporation of Ohio No Drawing. Application February 10, 1933, Serial No. 656,195

3 Claims. (Cl. 99—25)

This invention relates to improvements in the manufacture of a stable and homogeneous mixture of chocolate and milk for use as a beverage. Difficulties have been encountered heretofore in the preparation of such beverages because the solid material settled to the bottom and the fat arose to the top of the mixture after the mixture had set for a while. The use of various substances in the milk has failed to prevent such a separation.

This invention consists of the method and means for so treating and combining the ingredients as to prevent their separation when combined, so that a homogeneous "chocolate milk" may be prepared and will remain ready for use at all times after it is shipped to the dispenser or salesman.

Three distinct treatments of the various ingredients entering into the production of chocolate milk are necessary to prepare the material for use as a beverage. These treatments consist in first treating the whole or skimmed milk by itself; second, the preparation and treatment of the chocolate syrup for use in the milk; and, third, the combining and treatment of the mixture of whole or skimmed milk and chocolate syrup.

In carrying out the several steps, whole or skimmed milk is preheated to a temperature of approximately 70 degrees C. for a period of twenty minutes. This treatment causes a shift in the equilibrium of the calcium caseinate system, a separation of large amounts of the suspended phase and a subsequent increase in the viscosity by the swelling of the casein particles when the calcium is split off in the process of heating. The milk is then allowed to cool to a temperature of approximately 60 degrees C., at which temperature the chocolate syrup is added. The viscosity of the system is further built up by increasing the solid phase and the fat phase of the emulsion to that point where the solid, liquid, and fat phases reach such a balance as to produce a stable emulsion. The solid phase is increased by adding various flours and the fat phase by using a chocolate of such a fat content that the finished mixture shall contain 0.7% of cocoa butter.

The composition may be prepared from the following named ingredients. In the preparation of 100 pounds of the finished product, the following proportions have been found to give satisfactory results:

| | Pounds |
|---|---|
| Liquor chocolate | 11.0 |
| Sugar | 51.55 |
| Corn syrup | 6.35 |
| Gum tragacanth | 0.5 |
| Tapioca flour | 7.7 |
| Salt | 0.5 |
| Water | 22.1 | to which may be added an appropriate quantity of suitable flavoring substances to give the desired flavor and impart a distinctive character.

The "liquor chocolate" is a solid, bitter chocolate, which is unsweetened and contains between 50–54% cocoa butter. Due to loss of water by evaporation during the treatment, the resulting batch will be approximately 100 pounds when the amounts indicated above are used. The melted chocolate and the water are mixed together and heated over steam. The corn syrup is added to this mixture and thoroughly mixed with it. The dry ingredients are then mixed together and when thoroughly blended, the mixture of chocolate, water, and corn syrup is added to the dry mixture and thoroughly mixed together. The batch is then heated to a temperature of approximately 105 degrees C. and is stirred constantly. The liquid flavoring substances are then added. The finished composition may be stored in suitable air tight containers and preferably should be kept in a cool place until ready for use.

It will be noted that due to the solid phase of the emulsion by the addition of colloids such as gums and starch, such as in various flours, which are in the proportions as referred to of solids, liquid and fat (afforded by the cocoa butter, etc.), a balance is obtained for producing a stable emulsion.

In the preparation of the chocolate milk, the composition indicated above is added to the whole or skimmed milk which has been treated as indicated above. In this treatment, one part of the composition is added to ten parts of milk by volume. The composition is added to the whole or skimmed milk at a temperature of approximately 60 degrees C. The mixture of chocolate and milk is then heated to a temperature of approximately 80 degrees C. and is maintained at this temperature for approximately thirty minutes. At the end of this period, the mixture is cooled rapidly to a temperature of approximately 20 degrees C., at which temperature it is bottled and is stored for at least ten hours at a temperature of approximately 20 degrees C., after which time it is ready for use. Tests have provided that the mixture of chocolate and milk, prepared in accordance with the above indicated formula and method, will not result in a separation of the heavier substances to the bottom and the lighter substances to the top of the mixture, but the mixture remains stable practically indefinitely.

It will be obvious that various changes may be made in my process and that proportions may be varied slightly without departing from the spirit of the invention and, therefore, I do not limit myself to what is described in the specification, but only as indicated by the appended claims.

Having thus fully described my said invention, what I claim as new and desire to secure by Letters Patent, is:

1. The process of preparing a chocolate milk drink which comprises mixing together chocolate, water, and corn syrup, combining the gum, flour, salt, sugar and flavoring materials, blending the chocolate water mixture with the last named mixture and heating the mixture to approximately 105 degrees C.; heating whole or skimmed milk to a temperature of 70 degrees C. and cooling it approximately to 60 degrees C.; and adding one part of the mixture as prepared above to ten parts of the milk at 60 degrees C., heating the same slowly to a temperature of approximately 80 degrees C. and maintaining this temperature for approximately thirty minutes, then rapidly cooling to approximately 20 degrees C. and storing at this latter temperature for approximately ten hours.

2. A composition for the preparation of a homogeneous chocolate and milk beverage comprising a mixture of approximately the following ingredients and proportions:

| | Pounds |
|---|---|
| Liquor chocolate | 11.0 |
| Sugar | 51.55 |
| Corn syrup | 6.35 |
| Gum tragacanth | 0.5 |
| Tapioca flour | 7.7 |
| Salt | 0.5 |
| Water | 22.1 |
| Flavoring substances | |

3. The process of preparing a chocolate milk beverage which comprises heating milk to a temperature below the boiling point for a period long enough to cause a shift in the equilibrium of the calcium caseinate system, a separation of larger amounts of the suspended phase and a subsequent increase in the viscosity as a result of the swelling of the casein particles upon further heating, adding a chocolate mixture containing approximately 11 parts of chocolate liquor, 51.55 parts of sugar, 6.35 parts of corn syrup, 0.5 part of gum tragacanth, 7.7 parts of tapioca flour, 0.5 part of salt and 22.1 parts of water, heating the mixture of milk and chocolate at a temperature of approximately 80 degrees C. for about thirty minutes, then cooling the same rapidly to approximately 20° C.

BERNICE FICK.